3,052,636
ULTRA-VIOLET LIGHT STABILIZED
ORGANIC COMPOSITIONS
Albert F. Strobel, Delmar, and Sigmund C. Catino, Castelton, N.Y., assignors to General Aniline & Film Corporation, New York, N.Y., a corporation of Delaware
No Drawing. Filed May 26, 1959, Ser. No. 815,815
13 Claims. (Cl. 252—300)

This invention relates to new and useful compositions which are characterized as having superior resistance to degradation and deterioration when exposed to actinic radiation and in particular to organic compositions which are protected against deterioration when exposed to such radiations by the incorporation therewith of α-cyano-p-hydroxycinnamic acid esters and amides. This invention further relates to processes for preventing the deterioration and degeneration of organic materials when exposed to actinic radiations, and in particular to ultra-violet radiations. This invention still further relates to processes for the stabilization against deterioration by ultra-violet light of organic materials by the use of α-cyano-p-hydroxycinnamic acid esters.

Various organic compounds exhibit the power to absorb electromagnetic radiations within the band of 2900 to 3700 A. and when incorporated in various plastic materials such as transparent sheets, the resultant sheet acts as a filter for all of the radiation passing through and will transmit only such radiations as are not absorbed by the sheet and/or the absorbing agent. It is thus possible to screen out undesirable radiations and utilize the resulting transparent sheet as a filter in many technical and commercial applications such as wrappings for food products and the like.

Numerous organic compounds have been suggested as absorbents for the range of radiations described above, which range is designated as the ultra-violet range. Such uses include incorporation in plastic sheet materials and the stabilization in general of transparent plastic bodies. By far, the greatest concern with respect to ultra-violet radiations is with those radiations which come from the sun. Most of these radiations have wave lengths between 250 and 400 millimicrons. The effects of such radiation on the human skin, producing sunburn and suntan, are of course well known. Other effects, however, of great commercial importance relate to the photochemical degradation caused by ultra-violet radiations. Many commercial products are either unstable when subjected to such radiations, or are affected to the extent that they become undesirable or unsalable. Many plastic materials, when exposed to this radiation, undergo substantial degradation resulting in the development of undesirable color bodies and subsequent loss of transparency. Food products, in addition to becoming discolored, often become unfit for human consumption. Thus, prolonged exposure of fruits, edible oils, butter and other prepared foods will spoil and turn rancid on exposure to ultra-violet light. It is well known that colored objects such as dyed textiles will fade on exposure to sunlight, and in particular to ultra-violet light. Many plastics, in addition to developing color formation and reduction in transparency, become brittle, lose their elasticity, crack and eventually completely deteriorate on exposure to sunlight. Paints, varnishes, lacquers and the like also are prone to these effects, even though here the transparency program may not be paramount.

We have discovered that by combining α-cyano-p-hydroxycinnamic acid esters with organic materials, there results compatible combinations with a vast number of film forming plastics, resins, gums, waxes and the like, which combinations further exhibit outstanding ultra-violet absorbing properties within the generally encountered ultra-violet region of 250 to 400 millimicrons. The compounds which are employed in the compositions and processes of this invention, even though they exhibit outstanding absorbing properties close to the visible region of the electromagnetic field, nevertheless are essentially colorless compounds and can be employed with the assurance that they will not contribute to color in normally colorless formulations, nor will they affect the color of a colored formulation such as a paint film or a dyed textile.

It is therefore an object of the present invention to provide new and useful compositions characterized by improved resistance to degradation and deterioration by ultra-violet radiation.

It is still another object of this invention to provide compositions containing α-cyano-p-hydroxycinnamic acid esters which are resistant to ultra-violet deterioration.

It is a still further object of this invention to provide processes for improving the resistance of organic materials to deterioration and degradation by actinic radiation and especially ultra-violet radiation.

Other objects and advantages will appear hereinafter as the description proceeds.

The α-cyano-p-hydroxycinnamic acid esters which are employed in the compositions and processes of this invention are characterized by the following formula:

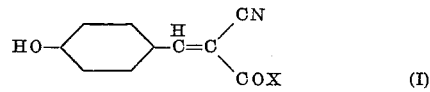   (I)

wherein X is $OR_1$ or $NR_2R_3$ and wherein $R_1$ is alkyl, alkenyl, hydroxyalkyl, haloalkyl, cyanoalkyl, alkoxyalkyl, hydroxyalkoxyalkyl, carbalkoxyalkyl, aryl, substituted aryl, aralkyl, alkaryl, hetero and substituted aralkyls, alkaryls and hetero; $R_2$ and $R_3$ may be hydrogen or any of the $R_1$ substituents.

In addition to the above contemplated derivatives, polyoxyalkylated derivatives thereof are within the purview of this invention. Any of the aforementioned derivatives containing at least one reactive hydrogen atom may be reacted with an alkylene oxide or a compound functioning as an oxide such as ethylene oxide, propylene oxide, butylene oxide, butylene dioxide, cyclohexane oxide, glycidol, epichlorohydrin, butadiene dioxide, isobutylene oxide, styrene oxide and mixtures thereof, and the like to yield the corresponding polyoxyalkylated product. Among the types of compounds which are reactive in this manner are the following: alcohols, amides, substituted amides, amines, sulfonamides, to yield compounds of the following general types:

(1) $WA(OX)_nOH$ designates compounds derived from alcohols wherein WA—OH represents the compounds of Formula I, A represents the bridge to the reactive grouping, e.g., —$CH_2CH_2$—, and $n$ is an integer from 1 to about 100.

(2) 

and

designate compounds derived from amides, substituted, amides, sulfonamides, substituted sulfonamides, amines and substituted amines wherein WA—H and

represent the compounds of Formula I, A represents, again, the bridge to the reactive grouping which is —SO₂N< in the case of sulfonamides and substituted sulfonamides, —CON< in the case of carboxylic amides and substituted carboxylic amides and —N< in the case of amines and substituted amines and n and m are integers from about 1 to 100 and R₂ has the same designation as in Formula I.

The following types of compounds derived from Formula I compounds are obtained:

(1) 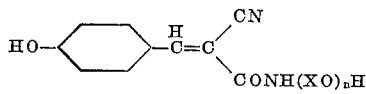

(2) 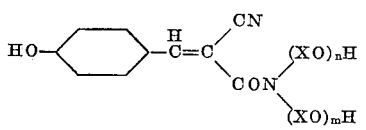

(3) 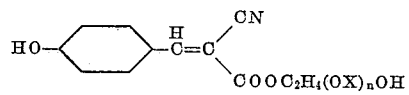

(4) 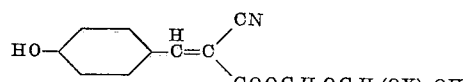

(5) 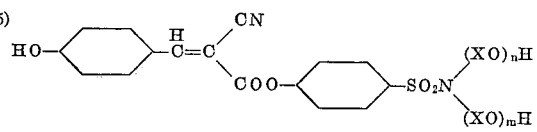

(6) 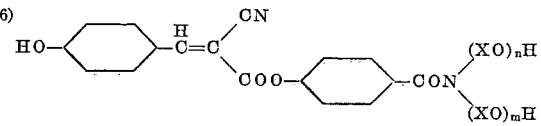

(7) 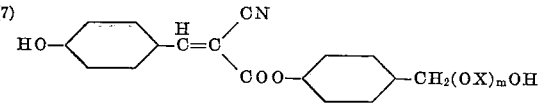

(8) 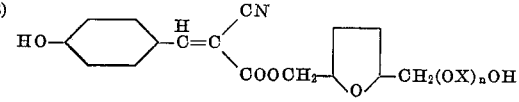

(9) 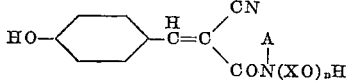

A=alkyl, e.g., methyl, ethyl, etc., aryl, e.g. phenyl, etc.

(10) 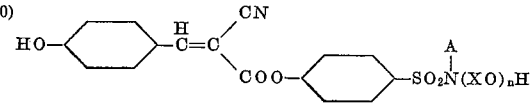

A=alkyl, e.g., methyl, ethyl, etc., aryl, e.g. phenyl, etc.

In Formulas 1–10 above n and m are integers from 1 to about 100.

The following specific substituents for R₁, R₂ and R₃ may be employed in the above generic formulation:

Ethyl and methyl
n-Propyl
Isopropyl
n-Butyl
Isobutyl
Amyl
Hexyl
Decyl
Lauryl
Stearyl
Cyanoethyl
Cyanopropyl (n-propyl, isopropyl)
Cyanobutyl (n-butyl, isobutyl, etc.)
Cyanoamyl
Cyanohexyl
Cyanodecyl
Cyanolauryl, and the like
Hydroxyethyl
Hydroxypropyl (n-propyl, isopropyl)
Hydroxybutyl (n-butyl, isobutyl, etc.)
Hydroxyamyl
Hydroxyhexyl
Hydroxydecyl
Hydroxylauryl, and the like
Chloroethyl
Chloropropyl (n-propyl, isopropyl)
Chlorobutyl (n-butyl, isobutyl, etc.)
Chloroamyl
Chlorohexyl
Chlorodecyl
Chlorolauryl, and the like
Bromoethyl
Bromopropyl (n-propyl, isopropyl)
Bromobutyl (n-butyl, isobutyl, etc.)
Bromoamyl
Bromohexyl
Bromodecyl
Bromolauryl, and the like
Methoxyethyl
Methoxypropyl (n-propyl, isopropyl)
Methoxybutyl (n-butyl, isobutyl, etc.)
Methoxyamyl
Methoxyhexyl
Methoxydecyl
Methoxylauryl, and the like
Ethoxyethyl
Ethoxypropyl (n-propyl, isopropyl)
Ethoxybutyl (n-butyl, isobutyl, etc.)
Ethoxyamyl
Ethoxyhexyl
Ethoxydecyl
Ethoxylauryl, and the like
Carbomethoxyethyl
Carbomethoxypropyl
Carbomethoxybutyl
Carbomethoxyamyl
Carbomethoxyhexyl
Carbethoxyethyl
Carbethoxypropyl
Carbethoxybutyl, etc.
Carbopropoxyethyl
Carbopropoxypropyl
Carbopropoxybutyl, etc.
Carbobutoxyethyl
Carbobutoxybutyl, etc.
Polyhydroxyalkyls, e.g., glyceryl, glycols, pentaerythritol
Allyl
Methallyl
Heterocyclics
　Furyl
　Tetrahydrofurfuryl
　Benzofuryl
　Thienyl
　Pyrryl
　Pyrollidyl
　2-pyrollidonyl
　Indolyl
　Carbazolyl
　Oxazolyl
　Thiazolyl
　Pyrazolyl
　Pyridyl
　Pyrimidyl
　Quinolyl, and the various following substituents therein
　　Alkyl
　　Alkoxy Halo
Carboxy
Carboalkoxy
Acyl
Acylamino Aryls
  Phenyl
  α-Naphthyl
  β-Naphthyl
  α-Anthryl
  β-Anthryl
  γ-Anthryl
  α-Anthraquinonyl
  β-Anthraquinonyl
  Cumyl
  Phenanthranyl
  Anisyl
  Phenetyl
  Tolyl
  p-Ethoxyphenyl
  9-methoxy-10-phenanthryl
  4-methoxy-α-naphthyl
  1-methoxy-β-naphthyl
  4-ethoxy-α-naphthyl
  7-ethoxy-β-naphthyl
  Hydroxyethyl phenyl
  Hydroxypropyl phenyl
  4-hydroxyethyl-α-naphthyl
  Chlorophenyl
  Bromophenyl
  2,4-dichlorophenyl
  2,5-dichlorophenyl
  2,4,6-trichlorophenyl
  2,5-dibromophenyl
  5-chloro-o-tolyl
  6-chloro-m-tolyl
  5-bromo-o-tolyl
  3-bromo-2,4-xylyl
  2,4-dichloro-α-naphthyl
  4-bromoacenaphthyl
  Carboxyphenyl
  Carboxytolyls
  Carboxyxylyls
  Carbalkoxylphenyls, e.g.,
    Carbomethoxylphenyl
    Carboethoxylphenyl
  Carbalkoxytolyls, e.g., carbomethoxytolyls
  Acetophenyl
  Propiophenyl
  Butyrophenyl
  Lauroylphenyl
  Acetotolyl
  Benzoyl naphthyl
  Acetaminophenyl
  Acet-methylamino phenyl
  Acetoaminotolyls
  Acetoaminonaphthyls
  Propio-aminophenyl
  Propio-aminotolyls, and the like.
  Sulfamyl phenyl
  Sulfamyl naphthyl
  N,N-dimethyl sulfamyl phenyl
  N,N-diethyl sulfamyl phenyl The general process for the preparation of the compounds of Formula I involves the condensation of p-hydroxy benzaldehyde with the corresponding ester or amide of cyanoacetic acid in the presence of a secondary base, as described in copending application Serial No. 788,508, filed January 23, 1959.

The usual procedure involves heating a mixture of the reactants in the presence of the basic catalyst at elevated temperatures until the reaction is substantially complete. A solvent may be employed to effect miscibility of the reactants and when such a solvent is used, the temperature of the reaction will usually be the reflux temperature of the alcoholic solution of the ingredients. In the absence of a solvent, temperatures from about 75 to 150° C. may be used. The time of reaction will of course vary depending upon the specific reactants and the temperature used. In some instances a relatively low temperature for a short period of time effects the formation of a substantially quantitative yield of the desired ester. In other cases, longer times and higher temperatures are necessary to get the best yields. It is of course again obvious to one skilled in the art to ascertain for any given combination of reactants the most efficacious combination of temperature and time.

Upon the completion of the esterification reaction, the desired ester is isolated, usually by evaporation of the volatile constituents, namely, water which is liberated in the condensation reaction, any alcohol which may be employed as a solvent, and the basic catalyst where the latter is a liquid and normally and readily removable by distillation or volatilization. It is also possible in certain instances, to isolate the desired ester product by diluting the reaction mixture with a solvent which precipitates out the ester. Thus, methanol may be employed in many cases as such a diluent, and the resultant slurry is then filtered at low temperatures (0 to 5° C.) to separate the crystalline product.

The following examples will serve to illustrate the present invention without being deemed limitative thereof. Where parts are indicated, parts by weight are intended.

EXAMPLE 1

A mixture of the following ingredients is prepared:
0.375 g. of α-cyano-p-hydroxycinnamic acid ethyl ester
4.0 cc. ethyl alcohol
7.0 cc. methyl cellosolve
10.0 cc. ethyl acetate
25.0 g. cellulose acetate dope (3.75 g. cellulose acetate +21.2 g. acetone)

The mixture forms a clear solution upon stirring together the ingredients. The viscous material is poured out on a glass plate and manually drawn out into a film with a Bird film applicator. The film is allowed to dry giving a total thickness of 5 mils. Food such as meat and butter wrapped with this colorless film undergoes less degradation than food wrapped with a similar film free of ultra-violet absorber.

EXAMPLE 2

A resin is prepared by adding 1% of a solution consisting of 50% of benzoylperoxide solution in tricresyl-phosphate to Polylite 8000 (a styrene modified maleic-phthalic-glycerol alkyd). 250 mg. of ultra-violet absorber of Example 1 is then added to 100 g. resin. A clear casting of polyester is made between glass plates treated on the mold side with Dri-Film SC-87 (G.E.). The gasket material used is Tygon tubing into which is inserted a copper wire to facilitate shaping of the mold. The Tygon tubing is then placed between two opal glass plates and clamped together to prevent leakage. The resin is cured as follows:
(1) Initial oven temperature=65° C., resin placed in oven, (2) temperature raised to 95° C., held 1 hour, then temperature is raised to 120° C. and held for ½ hour to complete the curing cycle. Resin prepared in this fashion containing ultra-violet absorber is definitely more light-fast than resin prepared with no absorber.

EXAMPLE 3

The procedure of Example 2 is repeated using, however, as the absorber the compound having the formula:

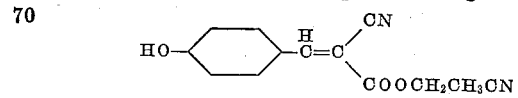

The resultant polyester exhibits greatly improved light stability.

EXAMPLE 4

The procedure of Example 1 is repeated employing as the ultra-violet absorber the compound of the formula:

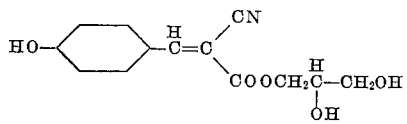

An excellently stabilized film results.

EXAMPLE 5

The procedure of Example 2 is again repeated using as the absorber a compound of the formula:

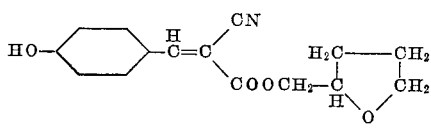

The polyester product is outstanding in its light stable properties.

EXAMPLE 6

A 10 gm. swatch of ethylene glycol terephthalic acid polyester cloth, "Dacron," is heated in a water bath containing 300 mls. of water, at 200° F. for 1 hour with a dispersion of 0.3 gms. of α-cyano-p-hydroxycinnamic acid ethyl ester absorber dispersed by pouring a 5 ml. alcohol solution of 0.3 g. of absorber into 300 mls. of vigorously stirred water at 200° F. An addition of 0.1 gm. of Monopol oil to the bath at the beginning aids in leveling of the product. The cloth is removed, rinsed, and dried after which it shows much better stability to ultra-violet light than the untreated cloth.

EXAMPLE 7

A film of cellulose butyrate is prepared using cellulose butyrate in place of cellulose acetate in Example 1 and containing 3% of the same ultra-violet absorber used in Example 1. This colorless film has a definitely preservative effect on meat wrapped in it and exposed to light in that the product is not darkened as much as when wrapped in a film of the same material free of absorber.

EXAMPLE 8

*Application to Photographic Film*

1 gm. of the ultra-violet absorbing compound of Example 1 is dissolved in 6 mls. of alcohol and 5 mls. of 10% wt./vol. sodium hydroxide. The solution is added to 90 mls. water and the pH of the solution adjusted to 7 by the addition of citric acid.

Processed color film is then bathed in the above solution for 10 minutes, then removed, rinsed, and dried. Exposure of the film to daylight causes no deterioration of the photographic images present in the processed film. Untreated film during the same exposure faded badly.

EXAMPLE 9

*Application of Polyethylene*

0.5 gm. of ultra-violet absorber of Example 1, 99.5 gms. polyethylene wax PT 95504 (Semet-Solvay) are melted at 120° C. to give a solution. The material is then pressed out hot in a Carver press to give a film of about 1/16″ thickness. Meat and other foods stored behind the film containing the absorber is less discolored on exposure to light than meat and other foods stored behind similar film prepared without absorber.

EXAMPLE 10

*Application of the Ultra-Violet Absorber of Example 1 to Furniture Polish*

A melt is made on a steam bath of:
9 oz. beeswax
1.5 pints turpentine
1.75 pints hot water containing 2 oz. soap The mixture is agitated with a Waring Blendor to form an emulsion. A similar formulation is made containing 3% of the weight of wax of the ultra-violet absorber of Example 1.

The formulation containing the ultra-violet absorber when applied to stained and varnished walnut gives better protection against discoloration (darkening) by light than the formulation free of absorber.

EXAMPLE 11

The procedure of Example 1 is repeated except that in place of the ethyl ester, the hydroxyethyl ester of α-cyano-p-hydroxycinnamic acid is used. Similar outstanding protection is afforded food products wrapped in films of this composition, as is the case in Example 1.

EXAMPLE 12

The procedure of Example 2 is repeated employing, however, the absorber of Example 11 in place of the one of Example 1. Again, an improved light-fast resin results.

EXAMPLE 13

To a 5% solution by weight of polyvinyl pyrrolidone in 95% ethyl alcohol, there is added 3% by weight based on the weight of the polymer of the hydroxy ethyl ester of α-cyano-p-hydroxycinnamic acid. A film cast from this composition exhibits far superior resistance to ultra-violet degradation than a similar film in the absence of the ultra-violet absorber.

EXAMPLE 14

Example 1 is again repeated employing as the ultra-violet absorber in lieu of the ethyl ester the methoxy ethyl ester. Good protection against ultra-violet degradation is obtained in this instance.

EXAMPLE 15

The reaction product of the hydroxy ethyl ester as employed in Examples 11 through 13 with 4 moles of ethylene oxide is dispersed in water in the amount of about 5% based on the water content. A viscous film, regenerated cellulose, is immersed in the bath for 30 minutes and thereafter dried. The absorbed reaction product amounts to about 0.3% based on the dry weight of the viscous film. This treated film not only is far superior in resisting ultra-violet light degradation but is also outstanding in the protection afforded products wrapped therein.

EXAMPLE 16

A phthalocyanine blue aqueous pigment press-cake containing 20% dry pigment is colloid milled with 35% based on the dry weight of the pigment of the reaction product of the hydroxyethyl of α-cyano-p-hydroxycinnamic acid with 9 moles of ethylene oxide. The resulting pigment forms well dispersed and substantially deflocculated dispersions in aqueous media. The dispersed pigment is incorporated into a butadiene-styrene polymer latex containing 30% polymer solids and 50% white pigments to give a total combination containing 5% phthalocyanine pigment in the latex. This composition is then employed to paint unprimed steel panels. Similar compositions lacking the ultra-violet absorber are also used in this manner. In this case the pigment is dispersed with an equal amount of a conventional dispersing agent, and particularly, sodium lignosulfonate. A comparison of the coated plates indicates in the former the outstanding superiority of the composition containing the ultra-violet absorber as far as light-fastness is concerned. In addition, the use of the subject ultra-violet absorber gives rise to coatings which exhibit greater brilliance and depth of shade.

EXAMPLE 17

The reaction product of the hydroxy ethyl ester of α-cyano-p-hydroxycinnamic acid with 15 moles of ethylene oxide is dispersed in an aqueous composition containing 10% polyvinyl alcohol. Films cast from this composition are outstanding in resisting ultra-violet light degradation.

EXAMPLE 18

The reaction product of α-cyano-p-hydroxycinnamic acid amide with 25 moles of ethylene oxide is dispersed in an aqueous gelatin composition to give a concentration of absorber of 1% based on the gelatin content of the composition. Films cast from this composition are far superior in their stability to ultra-violet light to similar films lacking the absorber.

EXAMPLE 19

The procedure of Example 2 is repeated employing as the absorber α-cyano-p-hydroxycinnamic acid phenyl ester. Similar results are obtained.

EXAMPLE 20

A 10 gram swatch of cloth woven from polyacrylonitrile fibers (10% acrylonitrile) is heated in a bath of 300 ml. of water at 210° F. for 40 minutes, the water containing a dispersion of 0.2 gram of the p-sulfamyl phenyl ester of α-cyano-p-hydroxycinnamic acid, which dispersion has been prepared by dissolving the ester in 10 ml. of ethyl alcohol and vigorously stirring the alcoholic solution into the water at the elevated temperature. The cloth is removed from the bath, dried and exhibits much better stabiltiy to ultra-violet light than the untreated cloth.

EXAMPLE 21

A dispersion of 1 gram of the hydroxyethoxyethyl ester of α-cyano-p-hydroxycinnamic acid in 250 ml. of water is used to treat a 10 gram sample of a jute textile material. The resultant treated product is more stable to ultra-violet light than a similar sample untreated.

EXAMPLE 22

The procedure of Example 6 is repeated using a compound having the formula:

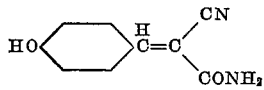

This compound is prepared in the manner disclosed in copending application Serial No. 788,508, filed January 23, 1959, by the condensation of p-hydroxy benzaldehyde with cyanoacetamide. The results are comparable to those of Example 6.

EXAMPLE 23

The procedure of Example 22 is repeated except that in lieu of cyanoacetamide, there is employed N,N-dimethylcyanoacetamide. The results, again, are comparable to those of Example 6.

The compounds in this invention are in general soluble in a great variety of solvents, plastics, resins, waxes and the like, and therefore are particularly adaptable for the stabilization of a great variety of different types of organic materials. The non-oxyalkylated products are insoluble in water. Those compounds which contain smaller amounts of oxyalkyl groups, that is, up to about 4 to 6 groups per molecule, are in general soluble in the more polar organic solvents and fairly readily dispersible in water. The compounds containing larger amounts of alkylene oxide, that is, above about 6 moles per mole of reactive hydrogen containing compound, range from soluble to extremely soluble in water, the solubility increasing as the number of oxyalkyl groups are increased.

The amount of stabilizer to be incorporated is not particularly critical except that sufficient should be present to effect the desired degree of stabilization, and no more should be employed than is necessary to obtain this result. In general, between 0.1% and 10% based on the solids content of the organic material may be used, and preferably between about 0.5% to about 2%. As exemplified above, the ultra-violet absorbers employed with this invention can be used not only to stabilize clear films, plastics and the like, but they may be employed in opaque, semi-opaque or translucent materials, the surface of which is susceptible to degradation by ultra-violet light. Among such different types of materials, most of which have been exemplified, are foamed plastics, opaque films and coatings, opaque papers, translucent and opaque fibers, transparent and opaque colored plastics, fluorescent pigments, polishes, creams, lotions and the like whether opaque, clear, or translucent. The compounds employed in this invention give outstanding protection to paint, enamel and varnish films against fading of pigments and dyes contained therein. The most outstanding and significant achievement of the compounds used in this invention lies in the remarkable ability of these compounds to protect and stabilize nitrocellulose containing compositions against ultra-violet light degradation.

Other variations in and modifications of the described processes which will be obvious to those skilled in the art can be made in this invention without departing from the scope or spirit thereof.

We claim:

1. An ultra-violet light stabilized organic composition containing from about 0.1 to about 10% based on the weight of said organic composition a compound of the formula:

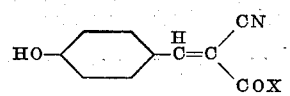

wherein X is selected from the group consisting of OR₁ and

and wherein R₁ is a radical selected from the group consisting of alkyl, alkenyl, hydroxyalkyl, haloalkyl, cyanoalkyl, alkoxyalkyl, hydroxyalkoxyalkyl, carbalkoxyalkyl, aryl, substituted aryl, aralkyl, alkaryl, and hetero, and R₂ and R₃ are selected from the group consisting of hydrogen and R₁.

2. A composition as defined in claim 1 wherein X is OC₂H₅.

3. A composition as defined in claim 1 wherein X is OCH₂CH₂OH.

4. A composition as defined in claim 1 wherein X is OCH₂CH₂CN.

5. A composition as defined in claim 1 wherein X is

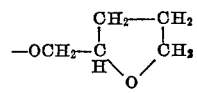

6. A composition as defined in claim 1 wherein X is NH₂.

7. An ultra-violet light stabilized transparent organic composition containing dispersed therein from about 0.1% to about 10% based on the weight of said organic composition of a compound of the formula:

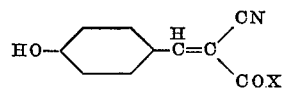

wherein X is selected from the group consisting of OR₁ and

and wherein R₁ is a radical selected from the group consisting of alkyl, alkenyl, hydroxyalkyl, haloalkyl, cyanoalkyl, alkoxyalkyl, hydroxyalkoxyalkyl, carbalkoxyalkyl, aryl, substituted aryl, aralkyl, alkaryl, and hetero, and $R_2$ and $R_3$ are selected from the group consisting of hydrogen and $R_1$.

8. A composition as defined in claim 7 wherein the stabilized organic material is nitrocellulose.

9. A composition as defined in claim 8 wherein the dispersed compound is α-cyano-p-hydroxy-cinnamic acid ethyl ester.

10. A composition as defined in claim 9 wherein the nitrocellulose is pigmented.

11. An ultra-violet light stabilized cellulose acetate composition containing from about 0.1 to about 10% by weight based on the weight of the cellulose acetate of a compound of the formula:

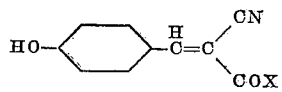

wherein X is selected from the group consisting of $OR_1$ and

and wherein $R_1$ is a radical selected from the group consisting of alkyl, alkenyl, hydroxyalkyl, haloalkyl, cyanoalkyl, alkoxyalkyl, hydroxyalkoxyalkyl, carbalkoxyalkyl, aryl, substituted aryl, aralkyl, alkaryl, and hetero, and $R_2$ and $R_3$ are selected from the group consisting of hydrogen and $R_1$.

12. A composition as defined in claim 11 wherein the cinnamic acid derivative is a α-cyano-p-hydroxycinnamic acid ethyl ester.

13. An ultra-violet light stabilized linear superpolyester fiber containing from about 0.1 to about 10% by weight based on the weight of said fiber of a compound of the formula:

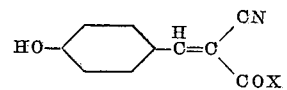

wherein X is selected from the group consisting of $OR_1$ and

and wherein $R_1$ is a radical selected from the group consisting of alkyl, alkenyl, hydroxyalkyl, haloalkyl, cyanoalkyl, alkoxyalkyl, hydroxyalkoxyalkyl, carbalkoxyalkyl, aryl, substtiuted aryl, aralkyl, alkaryl, and hetero, and $R_2$ and $R_3$ are selected from the group consisting of hydrogen and $R_1$.

References Cited in the file of this patent
UNITED STATES PATENTS

| | | |
|---|---|---|
| 2,436,007 | Kendall | Feb. 17, 1948 |
| 2,803,640 | Heckert | Aug. 20, 1957 |

OTHER REFERENCES

Plaisted: Contributions, Boyce Thompson Institute, vol. 18 (October 1954 to June 1957), page 232.